US010084679B2

(12) United States Patent
Ahmadzadeh et al.

(10) Patent No.: US 10,084,679 B2
(45) Date of Patent: Sep. 25, 2018

(54) STANDALONE NETWORK PROBING USING AVAILABLE NETWORK CONNECTIONS

(71) Applicant: QUALCOMM Incorporated, San Diego, CA (US)

(72) Inventors: Seyed Ali Ahmadzadeh, San Jose, CA (US); Saumitra Mohan Das, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 15/077,003

(22) Filed: Mar. 22, 2016

(65) Prior Publication Data
US 2017/0279701 A1 Sep. 28, 2017

(51) Int. Cl.
*H04L 12/26* (2006.01)
*H04L 29/06* (2006.01)

(52) U.S. Cl.
CPC .............. *H04L 43/12* (2013.01); *H04L 43/10* (2013.01); *H04L 67/42* (2013.01)

(58) Field of Classification Search
CPC ....... H04L 43/12; H04L 43/50; H04L 67/327; H04L 45/20; H04L 41/00; H04L 41/0896; H04L 41/022
USPC ................... 709/224; 370/252, 351, 248, 392
See application file for complete search history.

(56) References Cited

U.S. PATENT DOCUMENTS

| | | | | |
|---|---|---|---|---|
| 5,793,753 | A * | 8/1998 | Hershey | H04L 41/022 370/252 |
| 6,212,175 | B1 | 4/2001 | Harsch | |
| 6,717,914 | B1 * | 4/2004 | Hamami | H04L 41/00 370/248 |
| 6,826,172 | B1 * | 11/2004 | Augart | H04L 45/20 370/351 |
| 6,904,020 | B1 * | 6/2005 | Love | H04L 41/0803 370/252 |
| 7,554,983 | B1 * | 6/2009 | Muppala | H04L 41/0896 370/392 |
| 7,809,386 | B2 | 10/2010 | Stirbu | |
| 7,835,886 | B2 | 11/2010 | Vogel et al. | |
| 8,762,570 | B2 * | 6/2014 | Qian | H04L 67/327 709/241 |

(Continued)

OTHER PUBLICATIONS

International Search Report and Written Opinion—PCT/US2017/019068—ISA/EPO—dated May 22, 2017.

*Primary Examiner* — Frantz Coby
(74) *Attorney, Agent, or Firm* — Jae-Hee Choi; The Marbury Law Group

(57) ABSTRACT

Various embodiments provide methods, devices, and non-transitory processor-readable storage media enabling network probing with a communication device based on the communication device sending a probe via a first network connection and receiving the probe via a second network connection. By leveraging a capability of a communication device to establish two network connections at the same time, various embodiments may enable a single communication device to act as both a probing client and a probing server. In this manner, various embodiments may enable standalone network probing, i.e., network probing that may not require a remote dedicated probing server to act as a probe generator or a probe sink.

30 Claims, 8 Drawing Sheets

(56) References Cited

U.S. PATENT DOCUMENTS

| | | | |
|---|---|---|---|
| 2002/0165957 A1* | 11/2002 | Devoe | H04L 43/50 709/224 |
| 2005/0058112 A1 | 3/2005 | Lahey et al. | |
| 2009/0219392 A1* | 9/2009 | Roskowski | H04L 1/1685 348/143 |
| 2012/0106528 A1 | 5/2012 | Estevez et al. | |
| 2013/0028069 A1 | 1/2013 | Pelletier et al. | |
| 2013/0167196 A1* | 6/2013 | Spencer | H04W 8/22 726/3 |
| 2013/0246641 A1* | 9/2013 | Vimpari | H04L 47/10 709/228 |
| 2015/0117238 A1 | 4/2015 | Kronestedt et al. | |
| 2015/0239478 A1 | 8/2015 | Dorum et al. | |
| 2015/0333997 A1* | 11/2015 | Mermoud | H04L 43/12 370/252 |

* cited by examiner

STANDALONE NETWORK PROBING USING AVAILABLE NETWORK CONNECTIONS

BACKGROUND

Network based observations are among the most effective methods to obtain information about network topology and in-path devices. Network probing is also considered very effective for rogue network device detection. Current network based probing methods use dedicated servers to act as the probe generator or the probe sink. For example, in current network based probing methods, a probing client device often transmits a probe to a dedicated server. Thus, in current network based probing methods, the probing client device must know the dedicated server information ahead of time to initiate the connection with the dedicated server and the dedicated server needs to be up and running for the probe to be completed. Thus, current approaches for network probing are not scalable and depend on network access rules to enable network probing. Additionally, in current network based probing methods, rogue devices (e.g., rogue access points) can learn about the server and thwart the probing process using the same dedicated server information. For example, in current network based probing methods, each probe is often addressed to the same server address, thereby allowing probes to be identified and handled by rogue devices to thwart the probing process.

SUMMARY

Various embodiments provide methods, devices, and non-transitory processor-readable storage media enabling network probing with a communication device based on the communication device sending a probe via a first network connection and receiving the probe via a second network connection. By leveraging a capability of a communication device to establish two network connections at the same time, various embodiments may enable a single communication device to act as both a probing client and a probing server. In this manner, various embodiments may enable standalone network probing, i.e., network probing that may not require a remote dedicated probing server to act as a probe generator or a probe sink.

Various embodiments may include methods of network probing by a communication device including establishing, by the communication device, a first network connection of a first interface technology and a second network connection of a second interface technology, associating the first network connection with a probing client running on a processor of the communication device and associating the second network connection with a probing server running on the processor, transmitting a probe addressed to the probing server from the probing client via the first network connection, receiving the probe at the probing server via the second network connection, and determining a network observation based on receiving the probe at the probing server. In various embodiments, the first interface technology and the second interface technology may be different air interface technologies. In various embodiments, the different air interface technologies may be a cellular air interface technology and a wireless local area network (WLAN) interface technology. In various embodiments, the cellular air interface technology may be at least one member of the group consisting of 3G, 4G, LTE, and Edge. In various embodiments, the probing client and the probing server may be time-synchronized. In various embodiments, the probing client and the probing server may operate based on a same clock of the communication device. In various embodiments, the network observation may be a network delay. The network delay may be a round trip time or inter-packet delay.

In various embodiments, methods of network probing by a communication device may further include collecting first network setup information for the first network connection via the probing client, collecting second network setup information for the second network connection via the probing server, and generating the probe addressed to the probing server based at least in part on the first network setup information and the second network setup information.

In various embodiments, transmitting the probe addressed to the probing server from the probing client via the first network connection may include transmitting a plurality of probes addressed to the probing server from the probing client via the first network connection; receiving the probe at the probing server via the second network connection may include receiving the plurality of probes at the probing server via the second network connection; and determining the network observation based on receiving the probe at the probing server may include determining the network observation based on receiving the plurality of probes at the probing server. In various embodiments, the network observation may be an inter-packet delay.

In various embodiments, methods of network probing by a communication device may further include transmitting a probe addressed to the probing client from the probing server via the second network connection, and receiving the probe at the probing client via the first network connection. Determining the network observation based on receiving the probe at the probing server may include determining the network observation based on receiving the probe at the probing server and receiving the probe at the probing client.

Various embodiments may include a communication device configured with processor-executable instructions to perform operations of the methods described above.

Various embodiments may include a communication device having means for performing functions of the operations of the methods described above.

Various embodiments may include non-transitory processor-readable media on which are stored processor-executable instructions configured to cause a processor of a communication device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
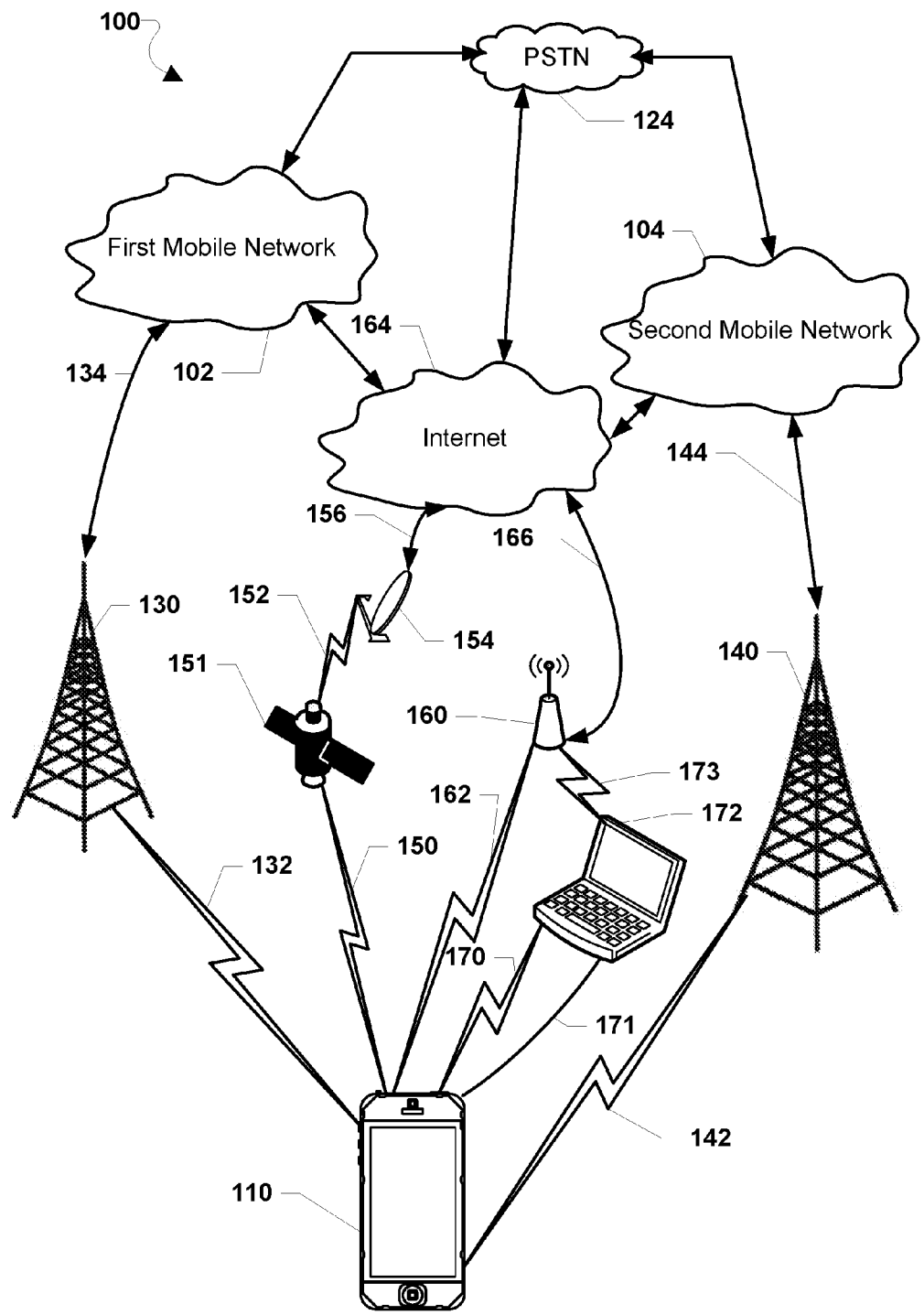
FIG. 1 is a communication system block diagram of a network suitable for use with the various embodiments.

Various embodiments and implementations will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

The terms "communication device" and "computing device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways. The various aspects may be useful in communication devices, such as mobile communication devices (e.g., smart phones), and so such devices are referred to in the descriptions of various embodiments. However, the embodiments may be useful in any electronic devices capable of establishing two different network connections at the same time.

Communication devices, such as mobile communication devices (e.g., smart phones), may use a variety of interface technologies, such as wired interface technologies (e.g., Universal Serial Bus (USB) connections, etc.) and/or air interface technologies (also known as radio access technologies)(e.g., Third Generation (3G), Fourth Generation (4G), Long Term Evolution (LTE), Edge, Bluetooth, Wi-Fi, satellite, etc.). Communication devices may establish connections to a network, such as the Internet, via more than one of these interface technologies at the same time (e.g., simultaneously). For example, a mobile communication device may establish an LTE network connection to the Internet via a cellular tower or a base station at the same time that the mobile communication device may establish a wireless local area network (WLAN) network connection (e.g., a Wi-Fi network connection) to an Internet connected Wi-Fi access point. The capability of communication devices to establish two different network connections at the same time may enable stand-alone communication device solutions to the problems experienced with network based probing.

Various embodiments provide methods, devices, and non-transitory processor-readable storage media enabling network probing with a communication device based on the communication device sending a probe via a first network connection and receiving the probe via a second network connection. By leveraging a capability of a communication device to establish two network connections at the same time, various embodiments may enable a single communication device to act as both a probing client and a probing server. In this manner, various embodiments may enable standalone network probing, i.e., network probing that may not require a remote dedicated probing server to act as a probe generator or a probe sink.

Various embodiments may include a probe manager running on a processor of a communication device, such as on the application processor of communication device, on a dedicated processor of the communication device, on a modem processor of the communication device, or on any one or more processors of the communication device. The probe manager may include (or interface with) a probing client and a probing server and the probe manager may control the operations of the probing client and probing server to send and receive probes to a network. The probing client may be configured to send probes and the probing server may be configured to receive probes.

In various embodiments, the probe manager may receive network observation requests from one or more applications on the communication device (i.e., one or more requesting applications). The network observation requests may be indications from the requesting applications of one or more network observations to be performed by the probe manager. Example network observations may include determinations of network delays, determinations of access configurations, determinations of protocol attributes, and determinations of network address translate (NAT) configurations. Determinations of network delays may include determining round trip time and inter-packet delays. Determinations of access configurations may include determining open ports and allowed protocols on the network (e.g., whether Internet Control Message Protocol (ICMP) packet filtering is occurring on the network). Determinations of network protocol attributes may include determining the maximum protocol data unit (PDU) packet length, protocol initial values (e.g., initial sequence number, etc.), header signatures (e.g., reserved header field values, Internet Protocol (IP) time-to-live (TTL), etc.) and protocol/version implementations on the network (e.g., Transmission Control Protocol (TCP) version used on the TCP stacks of the intermediate devices in the network). Determinations of NAT configurations may include determining the NAT setup (e.g., full cone, restricted cone, port restricted cone, symmetric, etc.) and the NAT port assignment (e.g., random, sequential, source (src) port related, etc.).

In response to receiving the network observation requests, the probe manager may generate one or more probes configured to enable the probe manager to determine one or more network observations with which to respond to the network observation requests. The one or more probes may be addressed to the probing server. The one or more probes may have varying contents, such as different headers and/or different payloads (e.g., random numbers inserted into the header and/or payload). The probe manager may control the operations of the probing client and probing server to send and receive the one or more probes addressed to the probing server to and from a network. The probe manager may track the time sent and/or other attributes of the sent probe and the time received and/or other attributes of the received probe.

Based on receiving the one or more probes from a network at the probing server, the probe manager may determine the one or more network observations and send the one or more network observations to the one or more requesting applications. For example, the probe manager may compare the time sent and/or other attributes of the sent probe and the time received and/or other attributes of the received probe to determine the one or more network observations.

The probe manager may establish a first network connection of a first interface technology and associate the first network connection with the probing client. The probe manager may establish a second network connection of a second interface technology and associate the second network connection with the probing server. In various implementations, the probe manager may associate the interface technologies of the first network connection and the second network connection with the probing client and the probing server, respectively, based on network configurations, the target network observations, and/or the states of the interface technologies (e.g., trusted, suspected, etc.). In some implementations, the first interface technology and the second interface technology may be different air interface technologies. For example, the first interface technology may be a cellular technology (e.g., 3G, 4G, LTE, Edge) and the second interface technology may be WLAN technology (e.g., Wi-Fi) or a personal area network technology (e.g., Bluetooth).

The probe addressed to the probing server may be sent from the probing client via the first network connection. The probe may be routed from the first network connection to the probing server via the second network connection over the two different interface technologies through the respective interface networks and through the Internet between those networks.

In various embodiments, the probing client and the probing server may be time-synchronized on the communication device. Because the probing client and probing server operate on the same communication device, the probing client and the probing server may not need to exchange external messages with one another to achieve timing synchronization. Synchronization may be handled on the device between the probing client and the probing server. In an embodiment, the probing client and the probing server may share/operate based on the same clock on the communication device. The sharing/operating on the same clock enables the time of reception of the probe to be timed accurately without the need for synchronization of clocks. By sharing the same clock, the transit time of packets sent from the probing client and received by the probing server may be observed by the probe manager without the need for timing synchronization between client and server.

Various embodiments enable a processor of a communication device to act as both probing client and probing server, thereby essentially operating as a single standalone device routing the same probe from the communication device back to the communication device. This standalone capability of various embodiments may eliminate a need for dedicated servers for making network observations.

Additionally, probe responses need not be sent from the probing server because the probe manager may track and compare the time sent and/or other attributes of the sent probe and the time received and/or other attributes of the received probe to determine the one or more network observations without any transmission of data off the device. Thus, the probe generation, data transmission, and data reception may reside on the same communication device. Eliminating probe responses may reduce the opportunity for rogue devices to learn about and thwart the probing process.

Further, because the same communication device sends and receives the probes, both inter-packet transmission time and inter-packet arrival time can be observed by the same processor. Significant variation in the inter-packet arrival time may indicate that a rogue access point that uses another wireless connection as its backhaul may be in the network path traversed by the probe and the network. Observations provided by various embodiments may enable the receiving applications to identify rogue access attacks.

The ability of various embodiments to dynamically generate probes with different probe structures, probing server addresses, timing, and contents may eliminate the probing pattern inherent in current network-based probing and/or reduce the chance that adversary devices could learn about the probing server and/or probe pattern and thwart or exploit the probing process.

Various embodiments may be implemented within a variety of communication systems 100, an example of which is illustrated in FIG. 1. A first mobile network 102 and a second mobile network 104 typically each include a plurality of cellular base stations (e.g., a first base station 130 and a second base station 140). The networks 102, 104 may also be referred to by those of skill in the art as access networks, radio access networks, base station subsystems (BSSs), Universal Mobile Telecommunications Systems (UMTS) Terrestrial Radio Access Networks (UTRANs), etc. The networks 102, 104 may use the same or different wireless interface technologies and/or physical layers. In an embodiment, the base stations 130, 140 may be controlled by one or more base station controllers (BSCs). Alternate network configurations may also be used and the embodiments are not limited to the configuration illustrated.

A first communication device 110 may be in communication with the first mobile network 102 through a cellular connection 132 to the first base station 130. The first communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

The cellular connections 132 and 142 may be made through two-way wireless communication links, such as Global System for Mobile Communications (GSM), UMTS (e.g., Long Term Evolution (LTE)), Frequency Division Multiple Access (FDMA), Time Division Multiple Access (TDMA), Code Division Multiple Access (CDMA) (e.g., CDMA 1100 1x), WCDMA, Personal Communications (PCS), Third Generation (3G), Fourth Generation (4G), Fifth Generation (5G), or other mobile communication technologies. In various embodiments, the communication device 110 may access networks 102, 104 after camping on cells managed by the base stations 130, 140.

The networks 102, 104 may be interconnected by public switched telephone network (PSTN) 124 and/or the Internet 164, across which the networks 102, 104 may route various incoming and outgoing communications to/from the communication device 110.

In some embodiments, the first communication device 110 may establish a wireless connection 162 with a wireless access point 160, such as over a WLAN connection (e.g., a Wi-Fi connection). In some embodiments, the first communication device 110 may establish a wireless connection 170 (e.g., a personal area network connection, such as a Bluetooth connection) and/or wired connection 171 (e.g., a USB connection) with a second communication device 172. The second communication device 172 may be configured to establish a wireless connection 173 with the wireless access point 160, such as over a WLAN connection (e.g., a Wi-Fi connection). The wireless access point 160 may be configured to connect to the Internet 164 or another network over the wired connection 166, such as via one or more modem and router. Incoming and outgoing communications may be routed across the Internet 164 to/from the communication device 110 via the connections 162, 170, and/or 171.

In some embodiments, the first communication device 110 may establish a wireless connection 150 with a satellite system 151. The satellite system 151 may establish a wireless connection 152 with one or more ground station 154 which may be connected to the Internet 164 by a wired connection 156, such as via one or more modem and router. Incoming and outgoing communications may be routed across the Internet 164 to/from the communication device 110 via the connection 150.

Figure 2:
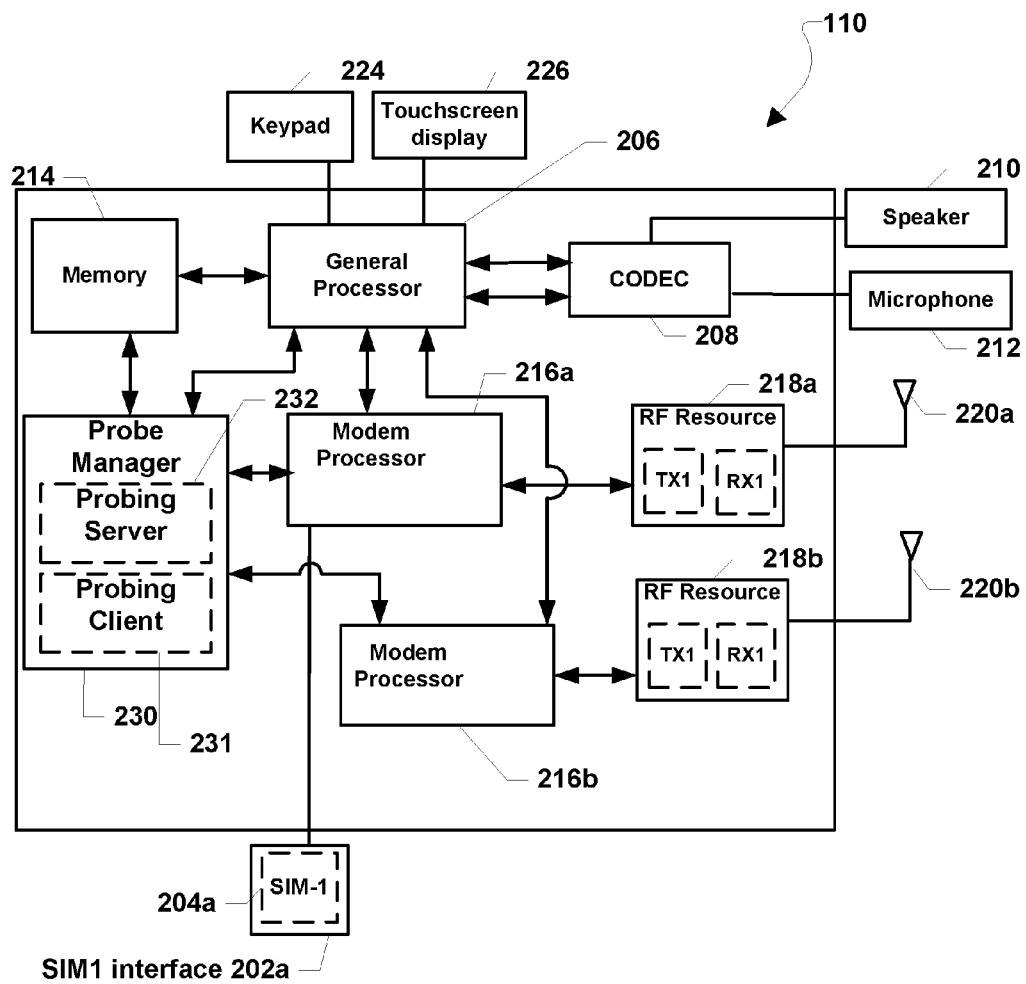
FIG. 2 is a block diagram illustrating a communication device according to various embodiments.

FIG. 2 is a functional block diagram of an example communication device 110 that is suitable for implementing various embodiments. With reference to FIGS. 1-2, the communication device 110 may include a first subscriber identity module (SIM) interface 202a, which may receive a first identity module SIM 204a that is associated with a first subscription.

A SIM, in various embodiments, may be a Universal Integrated Circuit Card (UICC) that is configured with SIM and/or Universal SIM (USIM) applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the Communication device 110 (e.g., memory 214), and thus need not be a separate or removable circuit, chip or card.

The communication device 110 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data though a corresponding radio frequency (RF) resource chain.

The memory 214 may store an operating system (OS), as well as user application software and executable instructions. The memory 214 may also store application data, such as an array data structure.

The general processor 206 and the memory 214 may each be coupled to at least two modem processors 216a and 216b. A first RF resource chain may include the first modem processor 216a, which may perform baseband/modem functions for communicating with/controlling an interface technology, and may include one or more amplifiers and radios, referred to generally herein as RF resources (e.g., RF resources 218a). The SIM 204a in the communication device 110 may use the first RF resource chain. The RF resource 218a may be coupled to antenna 220a and may perform transmit/receive functions for the wireless services, such as services associated with SIM 204a, of the communication device 110. The RF resource 218a may provide separate transmit and receive functionality, or may include a transceiver that combines transmitter and receiver functions. A second RF resource chain may include the second modem processor 216b, which may perform baseband/modem functions for communicating with/controlling an interface technology, and may include one or more amplifiers and radios, referred to generally herein as RF resources (e.g., RF resources 218b). The RF resource 218b may be coupled to antenna 220b and may perform transmit/receive functions for the wireless services of the communication device 110. The RF resource 218b may provide separate transmit and receive functionality, or may include a transceiver that combines transmitter and receiver functions.

In various embodiments, the first RF resource chain including the first modem processor 216a and the second RF resource chain including the second modem processor 216b may be associated with different interface technologies. As examples, one RF resource chain may be associated with a cellular air interface technology and the other RF resource chain may be associated with a WLAN technology, one RF resource chain may be associated with a cellular air interface technology and the other RF resource chain may be associated with a personal area network ("PAN") technology, one RF resource chain may be associated with a PAN technology and the other RF resource chain may be associated with a WLAN technology, one RF resource chain may be associated with a cellular air interface technology and the other RF resource chain may be associated with a satellite interface technology, and one RF resource chain may be associated with a WLAN technology and the other RF resource chain may be associated with a satellite air interface technology. Other combinations of different interface technologies, including wired and wireless combinations, may be substituted in the various embodiments, and cellular air interface technologies, WLAN technologies, satellite interface technologies, and PAN technologies are merely used as examples to illustrate aspects of the various embodiments.

In some embodiments, the general processor 206, the memory 214, the modem processors 216a, 216b, and the RF resources 218a, 218b may be included in the communication device 110 as a system-on-chip. In some embodiments, the SIM 204a and the corresponding interface 202a may be external to the system-on-chip. Further, various input and output devices may be coupled to components on the system-on-chip, such as interfaces or controllers. Example user input components suitable for use in the communication device 110 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the communication device 110 to enable communication between them. Inputs to the keypad 224, touchscreen display 226, and the microphone 212 discussed above are merely provided as examples of types of inputs that may initiate an outgoing call and/or initiate other actions on the communication device 110, and any other type of input or combinations of inputs may be used in various embodiments to initiate an outgoing call and/or initiate other actions on the communication device 110.

The communication device 110 may include a probe manager 230 configured to manage network probing. The communication device 110 may also include a probing client 231 configured to send probes via the different interface technologies of the communication device 110 and a probing server 232 configured to receive probes via the different interface technologies of the communication device 110. In various embodiments, the probing client 231, probe manager 230, and/or the probing server 232 may be time-synchronized on the communication device 110. Because the probing client 231 and probing server 232 operate on the same communication device 110, the probing client 231 and the probing server 232 may not need to exchange external messages with one another to achieve timing synchronization. Rather, on the communication device 110, exchanges between the probing client 231, the probe manager 230, and/or the probing server 232 may result in time-synchronization. In various embodiments, the probe manager 230, probing client 231, and/or probing server 232 may share and/or operate using the same clock on the communication device 110. In this manner, synchronization and/or timing adjustments between the probe manager 230, probing client 231, and probing server 232 may not be necessary on the communication device 110.

In some embodiments, the probe manager 230, probing client 231, and/or probing server 232 may be implemented within the general processor 206. In some embodiments, the probe manager 230, probing client 231, and/or probing server 232 may be implemented as a separate hardware component (i.e., separate from the general processor 206). In some embodiments, the probe manager 230, probing client 231, and/or probing server 232 may be implemented as a software application stored within the memory 214 and executed by the general processor 206.

In some embodiments, the probing client 231 and/or probing server 232 may be a subcomponent of the probe manager 230. In some embodiments, probing client 231 and/or probing server 232 may be separate from probe manager 230. In various embodiments, the probe manager 230, probing client 231, probing server 232, modem processors 216a, 216b, RF resources 218a, 218b, and/or SIM 204a may be implemented in hardware, software, firmware, or any combination thereof.

While two RF resource chains including the first modem processor 216a and the second modem processor 216b are illustrated in FIG. 2, additional RF resource chains and additional modem processors may be included in the communication device 110, thereby enabling additional network connections to be made at the same time. Additionally, wired connections may be established via modem processors connected to input/output ports of the communication device 110.

Figure 3:
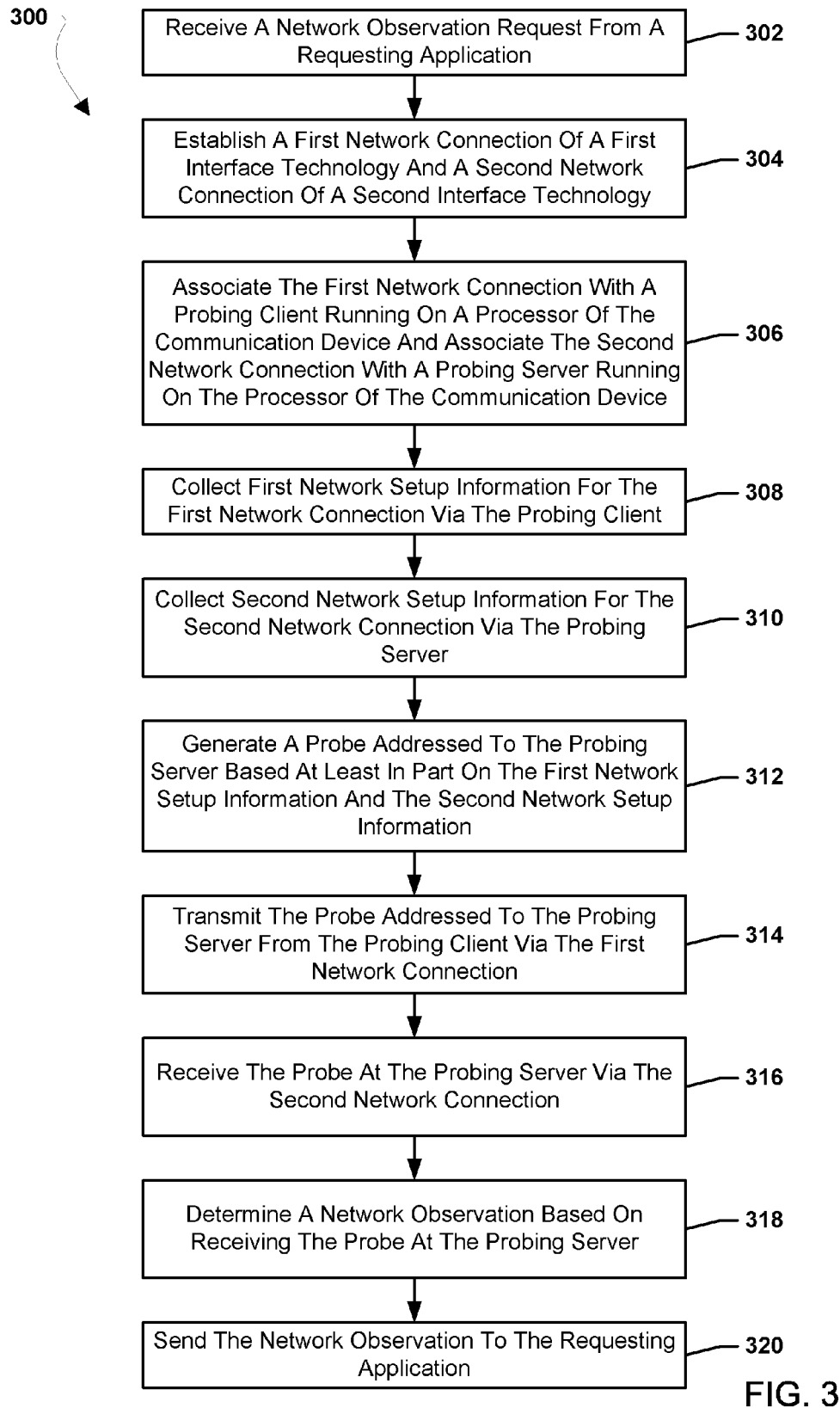
FIG. 3 is a process flow diagram illustrating a method for network probing with a communication device according to various embodiments.

FIG. 3 illustrates a method 300 for network probing according to various embodiments. With reference to FIGS. 1-3, the method 300 may be implemented with a processor (e.g., the general processor 206, the modem processors 216a, 216b, a separate controller, and/or the like) of a communication device (e.g., the communication device 110 described with reference to FIGS. 1-2). For example, the method 300 may be implemented by a probe manager (e.g., the probe manager 230) running on a processor (e.g., the general processor 206, the modem processors 216a, 216b, a separate controller, and/or the like) of a communication device (e.g., the communication device 110 described with reference to FIGS. 1-2).

In block 302 a probe manager may receive a network observation request from a requesting application. The requesting application may be an application running on a processor (e.g., the general processor 206, the modem processors 216a, 216b, a separate controller, and/or the like) of a communication device (e.g., the communication device 110 described with reference to FIGS. 1-2). The network observation request may be sent by the requesting application to trigger network probing to provide one or more network observation to the requesting application. For example, the requesting application may be a security application configured to analyze behavior vectors of a network to detect rogue access point attacks, and the network observation request may trigger network probing associated with detecting rogue access point attacks.

Example network observations that may be requested by applications include determinations of network delays, determinations of access configurations, determinations of protocol attributes, and determinations of NAT configurations. Determinations of network delays may include determining round trip delays and determining inter-packet delays. Determinations of access configurations may include determining open ports and determining allowed protocols on the network (e.g., whether ICMP packet filtering is occurring on the network). Determinations of network protocol attributes may include determining the maximum PDU packet length, determining protocol initial values (e.g., initial sequence number, etc.), determining header signatures (e.g., reserved header field values, IP TTL, etc.) and determining protocol/version implementation on the network (e.g., TCP version used on the TCP stacks of the intermediate devices in the network). Determinations of NAT configurations may include determining NAT setup (e.g., full cone, restricted cone, port restricted cone, symmetric, etc.) and determining NAT port assignment (e.g., random, sequential, src port related, etc.). In various embodiments, the network observation request may indicate the network observation to be determined by network probing.

In block 304 the probe manager may establish a first network connection of a first interface technology and a second network connection of a second interface technology. For example, the probe manager may control a first RF resource chain of a communication device to establish a WLAN connection (e.g., a Wi-Fi connection) and a second RF resource chain of the communication device to establish a cellular connection. As another example, the probe manager may control a first RF resource chain of a communication device to establish a WLAN connection (e.g., a Wi-Fi connection) and a second RF resource chain of the communication device to establish a satellite connection. As a further example, the probe manager may control a first RF resource chain of a communication device to establish a cellular connection and a second RF resource chain of the communication device to establish a satellite connection. In a further example, the probe manager may control a first RF resource chain of a communication device to establish a cellular connection and a second RF resource chain of the communication device to establish a PAN connection (e.g., a Bluetooth connection). Other combinations of different interface technologies, including wired and wireless combinations, may be substituted in various implementations. Cellular air interface technologies, WLAN technologies, satellite interface technologies, and PAN technologies are referred to herein merely as examples to illustrate aspects of the various embodiments.

In block 306, the probe manager may associate the first network connection with a probing client running on a processor of the communication device and associate a second network connection with a probing server running on the processor of the communication device. The network associated with the probing client (e.g., probing client 231) running on the processor of the communication device and the network associated with the probing server (e.g., probing server 232) running on the processor of the communication device may be based on network configurations, the target network observations, and/or the states of the interface technologies (e.g., trusted, suspected, etc.). For example, an interface technology suspected of being compromised by a rogue access point attack may be the interface technology of the first network connection and the first network connection may be associated with the probing client, while a trusted interface technology may be the interface technology of the second network connection and the second network connection may be associated with the probing server.

In block 308 the probe manager may collect first network setup information for the first network connection via the probing client, and in block 310 the probe manager may collect second network setup information from the second network connection via the probing server. While illustrated in FIG. 3 as occurring in a defined order, the operations of blocks 308 and 310 need not occur sequentially as illustrated. In various embodiments, the operations of block 308 may occur before the operations of block 310. In various embodiments the operations of block 310 may occur before the operations of block 308. In various embodiments, the operations of blocks 308 and 310 may occur at the same time. Network setup information may include the address of the network connection, such as the global IP address, NAT configurations of the network connection, such as NAT setup (e.g., full cone, restricted cone, port restricted cone, symmetric, etc.), NAT port assignment (e.g., random, sequential, src port related, etc.), etc., and any other information the probing client or probing server may determine about the respective network connections each may be associated with.

In block 312, the probe manager may generate a probe addressed to the probing server based at least in part on the first network setup information and the second network setup information. For example, the probe manager may generate a probe addressed from the probing client to the probing server based at least in part on the addresses of the respective network connections, such as the respective global IP addresses.

In various implementations, the probe may be generated based on more than merely the first network setup information and the second network setup information. For example, the probe may be generated based on the network observation request in addition to the first network setup information and the second network setup information.

In various implementations, the probe may be generated in block 312 with content based on the network observation request, first network setup information, and/or the second network setup information. The probe may be generated in various manners, including with randomly generated contents, such as a header and/or payload element that is a random number. For example, the probe may be an ICMP ping packet.

In block 314, the probe manager may transmit the probe addressed to the probing server from the probing client via the first network connection. Transmitting the probe addressed to the probing server from the probing client via the first network connection may include tracking the time the probe was transmitted by the probing client and/or other attributes of the sent probe.

In block 316, the probe manager may receive the probe at the probing server via the second network connection. Receiving the probe addressed to the probing server at the probing server via the second network connection may include tracking the time that the probe was received by the probing server and/or other attributes of the received probe. In various embodiments, the probing client and the probing server may be time-synchronized on the communication device. Because the probing client and probing server operate on the same communication device, the probing client and the probing server may not need to exchange external messages with one another to achieve timing synchronization. Synchronization may be handled on device between the probing client and the probing server. In an embodiment, the probing client and the probing server may share/operate based on the same clock on the communication device. The sharing/operating on the same clock enables the time of reception of the probe to be timed accurately without the need for synchronization of clocks. By sharing the same clock, the transit time of packets sent from the probing client and received by the probing server may be observed by the probe manager without the need for timing synchronization between client and server.

In block 318, the probe manager may determine a network observation based on receiving the probe at the probing server. For example, the probe manager may compare the time sent and/or other attributes of the sent probe and the time received and/or other attributes of the received probe to determine the one or more network observations. Example network observations that may be determine based on comparing the time sent and/or other attributes of the sent probe and the time received and/or other attributes of the received probe may include network delays (e.g., round trip delays, inter-packet delays, etc.), access configurations (e.g., open ports, ICMP packet filtering status, etc.), protocol attributes (e.g., maximum PDU packet length, initial sequence number, reserved header field values, IP TTL, TCP version information, etc.), and/or NAT configurations (e.g., full cone, restricted cone, port restricted cone, symmetric, NAT port assignment, etc.). As a specific example, the probe manager may determine a network observation based on receiving the probe addressed to the probing server at the probing server by calculating the one-way delay of the probing client to probing server network path. The probe manager may calculate the one-way delay by subtracting the recorded receive time at the probing server from the recorded transmit time at the probing client.

In block 320, the probe manager may send the network observation to the requesting application. The requesting application may use the network observation determined by network probing. For example, the requesting application may be a security application configured to analyze behavior vectors of a network to detect rogue access point attacks, and the network observation may be used to determine whether or not a rogue access point is operating in a network.

In various embodiments, the method 300 may be performed by the probe manager each time a network observation request is received from a requesting application. In various embodiments, because new network connections may be established in response to each network observation request, new network setup information, such as new network addresses, may be collected for the first and second network connections each time the method 300 is performed.

Regardless of whether the addressing changes, new random numbers may be inserted into probes on each execution of the method 300. In this manner, if the method 300 is performed repeatedly, the method 300 may dynamically generate probes with different probe structures, probing server addresses, and contents, which may eliminate the probing pattern inherent in current network based probing. This may reduce the chance that adversary devices could learn about the probing server and/or probe pattern and thwart or exploit the probing process.

Figure 4:
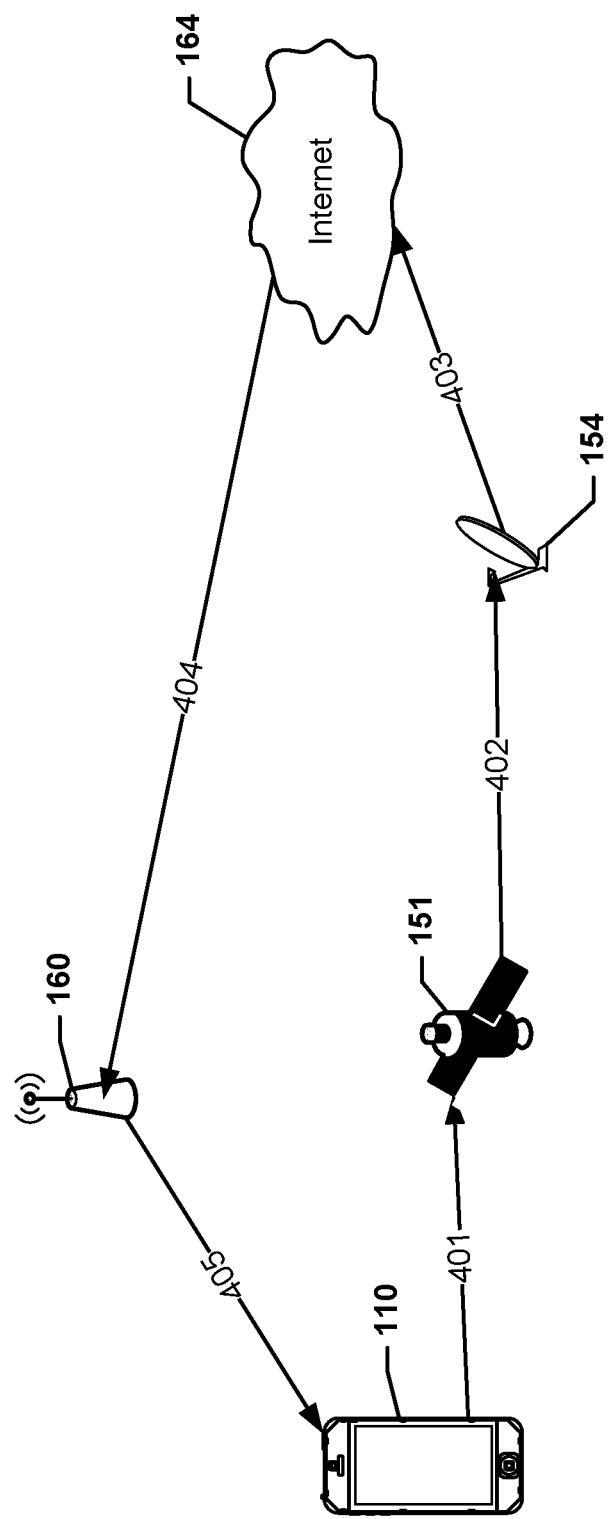
FIG. 4 is a call flow block diagram illustrating interactions between a communication device and a network for network probing according to various embodiments.

FIG. 4 is a call flow network diagram illustrating interactions between a communication device (e.g., the communication device 110 described with reference to FIGS. 1-3) and a network for network probing according to various embodiments. The communication device 110 may establish a first network connection of a satellite interface technology with a satellite system 151 and a second network connection of a WLAN interface technology with a wireless access point 160.

The communication device 110 may generate a probe addressed to the probing server running on a processor (e.g., the general processor 206, the modem processors 216a, 216b, a separate controller, and/or the like) of the communication device 110. In operation 401, the communication device 110 may send the probe addressed to the probing server from the probing client via the first network connection to the satellite system 151.

In operation 402, the satellite system 151 may route the probe addressed to the probing server to the ground station 154. In operation 403, the ground station 154 may route the probe addressed to the probing server to the Internet 164. In operation 404, the probe addressed to the probing server may be routed over the Internet 164 to the wireless access point 160. In operation 405, the wireless access point 160 may send the probe addressed to the probing server to the communication device 110.

Figure 5:
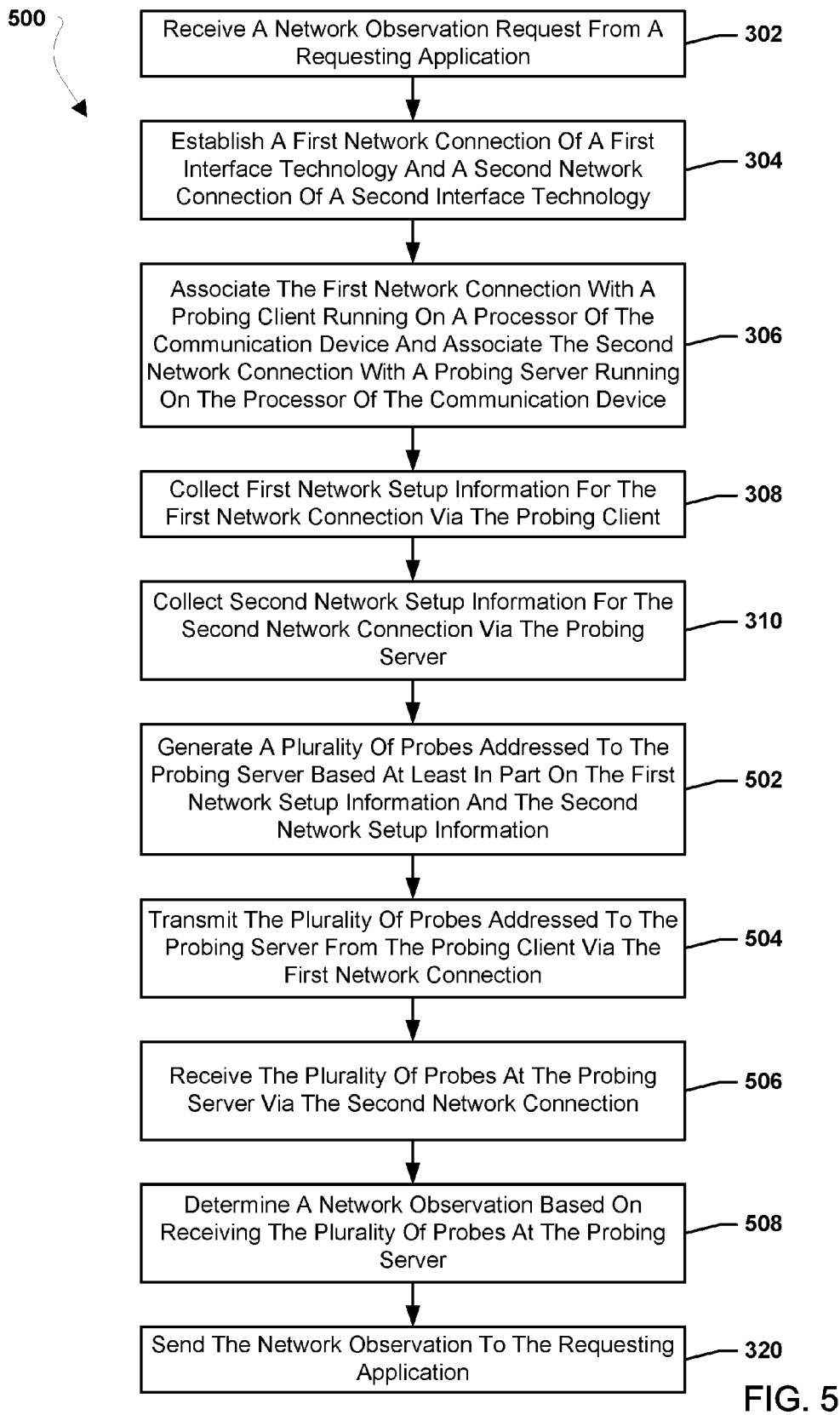
FIG. 5 is a process flow diagram illustrating a method for network probing with a communication device according to various embodiments.

FIG. 4 illustrates how using two different network connections established by the communication device 110 enables a probe to be routed through a public network, such as the Internet 164, and back to the communication device 110, thereby enabling the single communication device 110 to operate as both probing client and probing server in a standalone manner FIG. 5 illustrates a method 500 for network probing according to various embodiments. With reference to FIGS. 1-5, the method 500 may be implemented with a processor (e.g., the general processor 206, the modem processors 216a, 216b, a separate controller, and/or the like) of a communication device (e.g., the communication device 110). For example, the method 500 may be implemented by a probe manager (e.g., the probe manager 230) running on a processor (e.g., the general processor 206, the modem processors 216a, 216b, a separate controller, and/or the like) of a communication device. The method 500 may be similar to the method 300 described with reference to FIG. 3, except that method 500 may enable a plurality of probes addressed to the probing server to be sent from the probing client.

In blocks 302-310 the probe manage may perform operations of like numbered blocks of method 300 described with reference to FIG. 3 to receive a network observation request, establish network connections, associated the network connections, and collect network setup information.

In block 502, the probe manager may generate a plurality of probes addressed to the probing server based at least in part on the first network setup information and the second network setup information. In various implementations, the plurality of probes may be two, three, four, or more probes. In some embodiments, the plurality of probes may be identical. In some embodiments, the plurality of probes may have different header and payload values (e.g., different sizes, different TTL values, etc.). Regardless of whether the probes are all the same or one or more of the probes are different, the probe structure may be known when the probes are transmitted because the probe manager is resident on the device.

In block 504 the probe manager may transmit the plurality of probes addressed to the probing server from the probing client via the first network connection. In various embodiments, the probing client may transmit the plurality of probes sequentially with a predetermined time spacing between each probe transmission. As an example, the probe manager may generate and the probing client may transmit probes with a fixed or randomized inter-packet delays (IPD). As the probe manager, probing server, and probing client function on the same device, the probe structure and the IPD values may be known at the probing client and the probing server at the time of transmission.

In block 506 the probe manager receives the plurality of probes at the probing server via the second network connection.

In block 508 the probe manager may determine a network observation based on receiving the plurality of probes addressed to the probing server at the probing server. For example, the probe manager may determine the inter-packet arrival times between the plurality of probes. Significant variation in the inter-packet arrival time may indicate that a rogue access point that uses another wireless connection as its backhaul may be in the network path traversed by the plurality of probes and the network observation of inter-packet arrival time may enable the receiving application to identify rogue access attacks. As an example, using the combination of the probes transmitted by the probing client and responses generated by the probing server, the probe manager may make multiple determinations about the network and in-path node behaviors including: 1) whether the query has reached the probing server intact, and/or 2) whether the client response has reached the probing client intact.

In block 320 the probe manager may send the network observations to the requesting application as described for the like numbered block of method 300 described with reference to FIG. 3.

Figure 6:
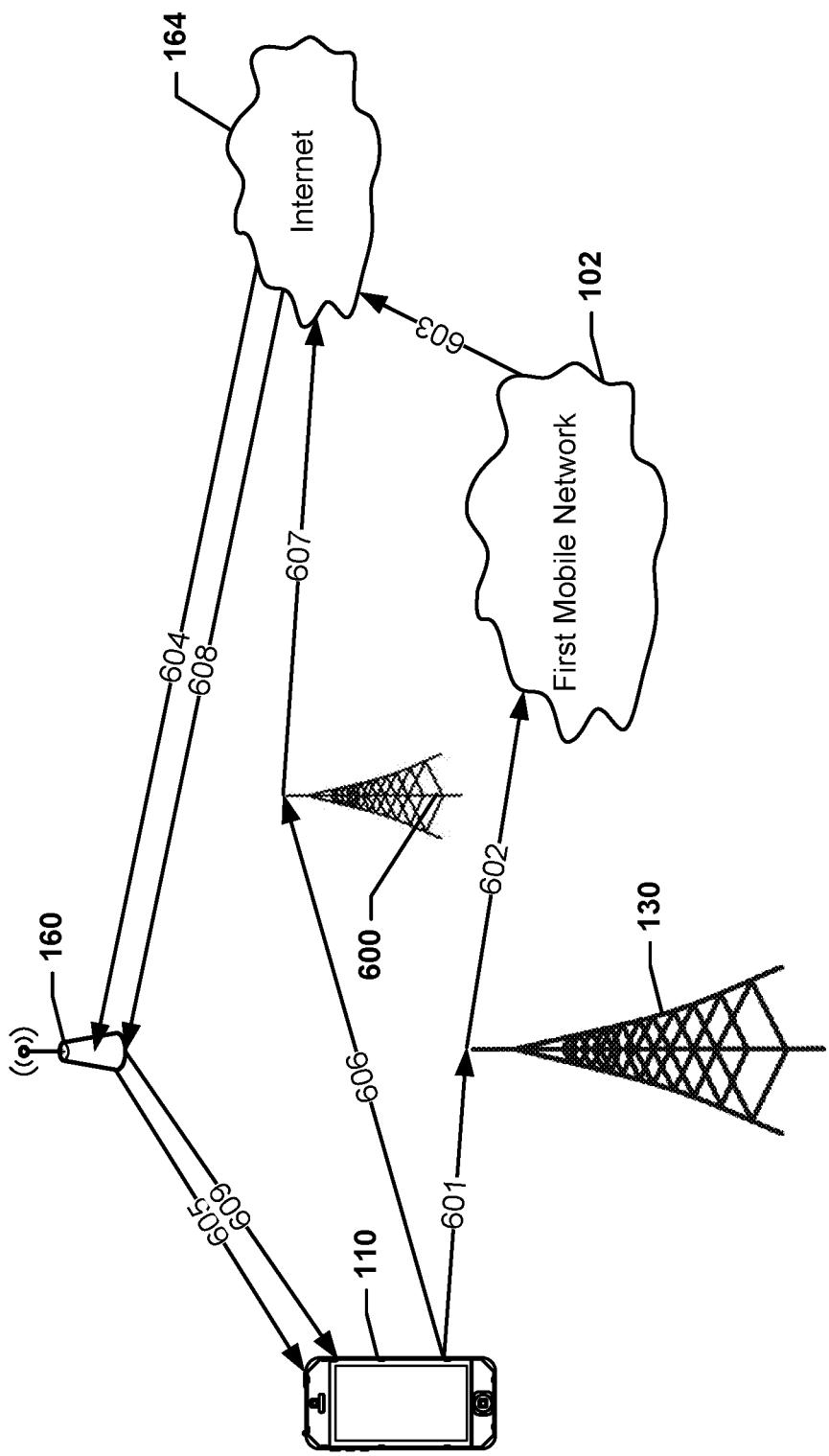
FIG. 6 is a call flow block diagram illustrating interactions between a communication device and a network for network probing according to various embodiments.

FIG. 6 is a call flow network diagram illustrating interactions between a communication device (e.g., the communication device 110 described with reference to FIGS. 1-5) and a network for network probing according to various embodiments. With reference to FIGS. 1-6, the communication device 110 may establish a first network connection of a cellular interface technology with base station 130 connected to a first mobile network 102 and a second network connection of a WLAN interface technology with a wireless access point 160. A rogue access point 600 may also establish a connection to the communication device 110, for example by spoofing the base station 130. In such a situation, the communication device 110 may inadvertently send data to the rogue access point 600, which may use a different backhaul connection to the Internet 164 than the base station 130 connected to a first mobile network 102.

The communication device 110 may generate a plurality of probes addressed to the probing server running on a processor of the communication device 110. In operation 601, the communication device 110 may send a first probe of the plurality of probes addressed to the probing server from the probing client via the first network connection to the base station 130. In operation 602, the base station 130 may route the first probe addressed to the probing server to the first mobile network 102. In operation 603, the first mobile network 102 may route the first probe addressed to the probing server to the Internet 164. In operation 604, the first probe addressed to the probing server may be routed over the Internet 164 to the wireless access point 160. In operation 605, the wireless access point 160 may send the first probe addressed to the probing server to the communication device 110.

In operation 606, the communication device 110 may send a second probe of the plurality of probes addressed to the probing server from the probing client via the first network connection. However, as the rogue access point may have spoofed the base station 130, the second probe may be sent to the rogue access point 600. In operation 607, the rogue access point 600 may route the second probe addressed to the probing server to the Internet 164. In operation 608, the second probe addressed to the probing server may be routed over the Internet 164 to the wireless access point 160. In operation 609, the wireless access point 160 may send the second probe addressed to the probing server to the communication device 110.

As illustrated in FIG. 6, by sending multiple probes using the two different network connections established by the communication device 110, a single communication device 110 may operate as both probing client and probing server in a standalone manner to test for the presence of a rogue actors in various networks. For example, by comparing the transit times or transmission delays of the first and second probes received at the probing server, the communication device 110 may detect the presence of a rogue access point 600 in the network path.

Figure 7:
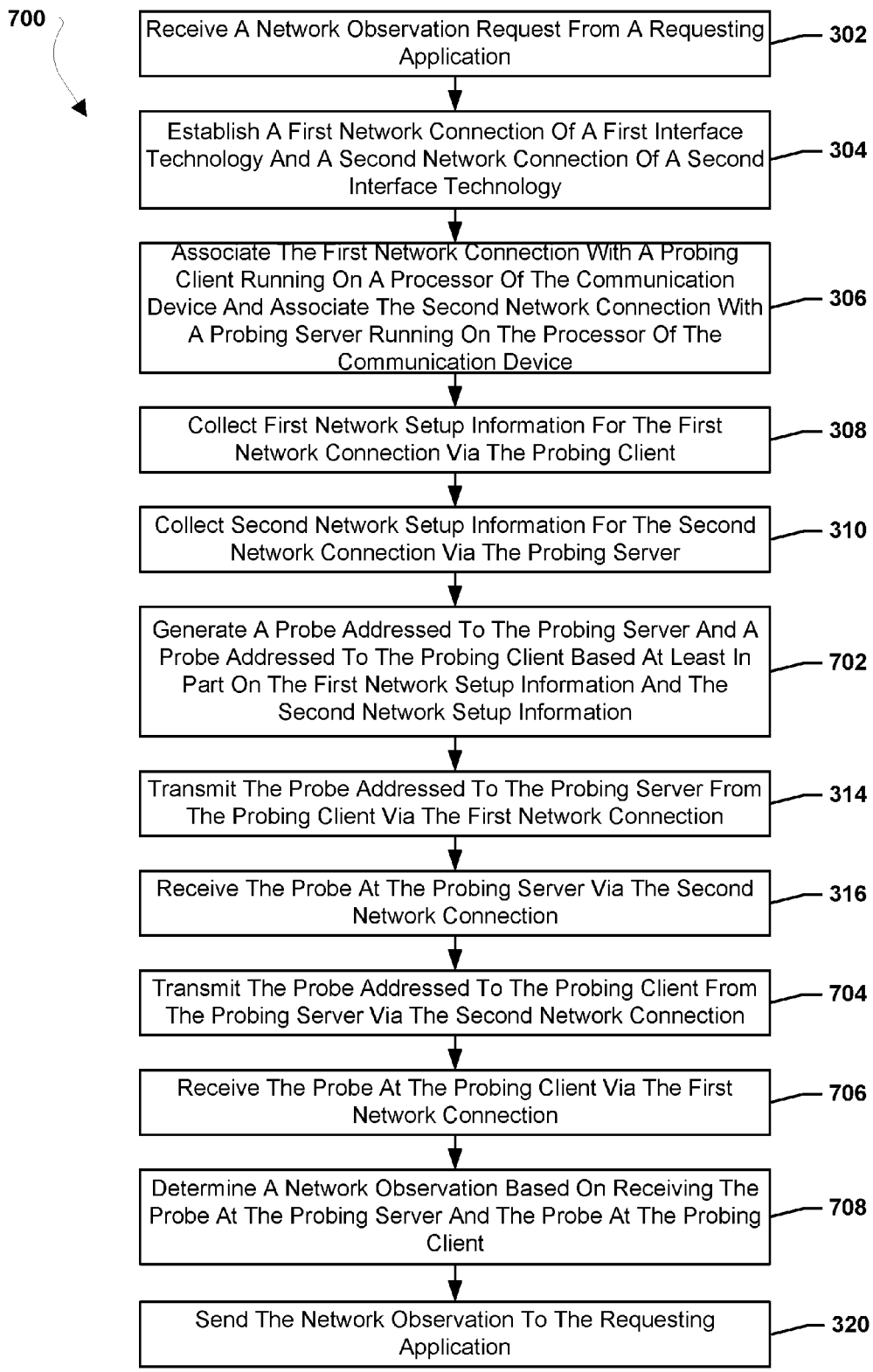
FIG. 7 is a process flow diagram illustrating a method for network probing with a communication device according to various embodiments.

FIG. 7 illustrates a method 700 for network probing according to various embodiments. With reference to FIGS. 1-7, the method 500 may be implemented with a processor (e.g., the general processor 206, the modem processors 216a, 216b, a separate controller, and/or the like) of a communication device (e.g., the communication device 110). For example, the method 500 may be implemented by a probe manager (e.g., the probe manager 230) running on a processor (e.g., the general processor 206, the modem processors 216a, 216b, a separate controller, and/or the like) of a communication device. The method 700 may be similar to the method 300 described with reference to FIG. 3, except that the method 700 may enable a probe addressed to the probing client to be sent from the probing server.

In blocks 302-310, the probe manage may perform operations of like numbered blocks of method 300 described with reference to FIG. 3 to receive a network observation request, establish network connections, associated the network connections, and collect network setup information.

In block 702, the probe manager may generate a probe addressed to the probing server and a probe addressed to the probing client based at least in part on the first network setup information and the second network setup information. For example, the probe manager may generate the respective probes addressed from the probing client to the probing server and the probing server to the probing client based at least in part on the addresses of the respective network connections, such as the respective global IP addresses.

In blocks 314 and 316, the probe manage may perform operations of like numbered blocks of the method 300 described with reference to FIG. 3 to transmit the probe addressed to the probing server from the probing client via the first network connection and receive the probe addressed to the probing server via the second network connection.

In block 704, the probe manager may transmit the probe addressed to the probing client from the probing server via the second network connection. Transmitting the probe addressed to the probing client from the probing server via the second network connection may include tracking the time that the probe was transmitted by the probing server and/or other attributes of the sent probe.

In block 706, the probe manager may receive the probe at the probing client via the first network connection. Receiving the probe addressed to the probing client at the probing client via the first network connection may include tracking the time that the probe was received by the probing client and/or other attributes of the received probe.

In block 708, the probe manager may determine a network observation based on receiving the probe at the probing server and the probe at the probing client. For example, the probe manager may compare the time sent and/or other attributes of the sent probes and the time received and/or other attributes of the received probes to determine the one or more network observations. Example network observations that may be determined based on such comparisons may include network delays (e.g., round trip delays, inter-packet delays, etc.), access configurations (e.g., open ports, ICMP packet filtering status, etc.), protocol attributes (e.g., maximum PDU packet length, initial sequence number, reserved header field values, IP TTL, TCP version information, etc.), and/or NAT configurations (e.g., full cone, restricted cone, port restricted cone, symmetric, NAT port assignment, etc.). As a specific example, the probe manage may determine a network observation based on receiving the probe addressed to the probing server at the probing server by calculating the one-way delay of the forward path from the probing client to probing server and the reverse path delay from the probing server to the probing client. The probe manager may calculate the forward path delay by subtracting the recorded receive time at the probing server from the recorded transmit time at the probing client. Similarly, the probe manager may calculate the reverse path delay by subtracting the recorded receive time at the probing client from the recorded transmit time at the probing server.

In block 320, the probe manager may send the network observations to the requesting application as described for the like numbered block of the method 300 described with reference to FIG. 3.

Figure 8:
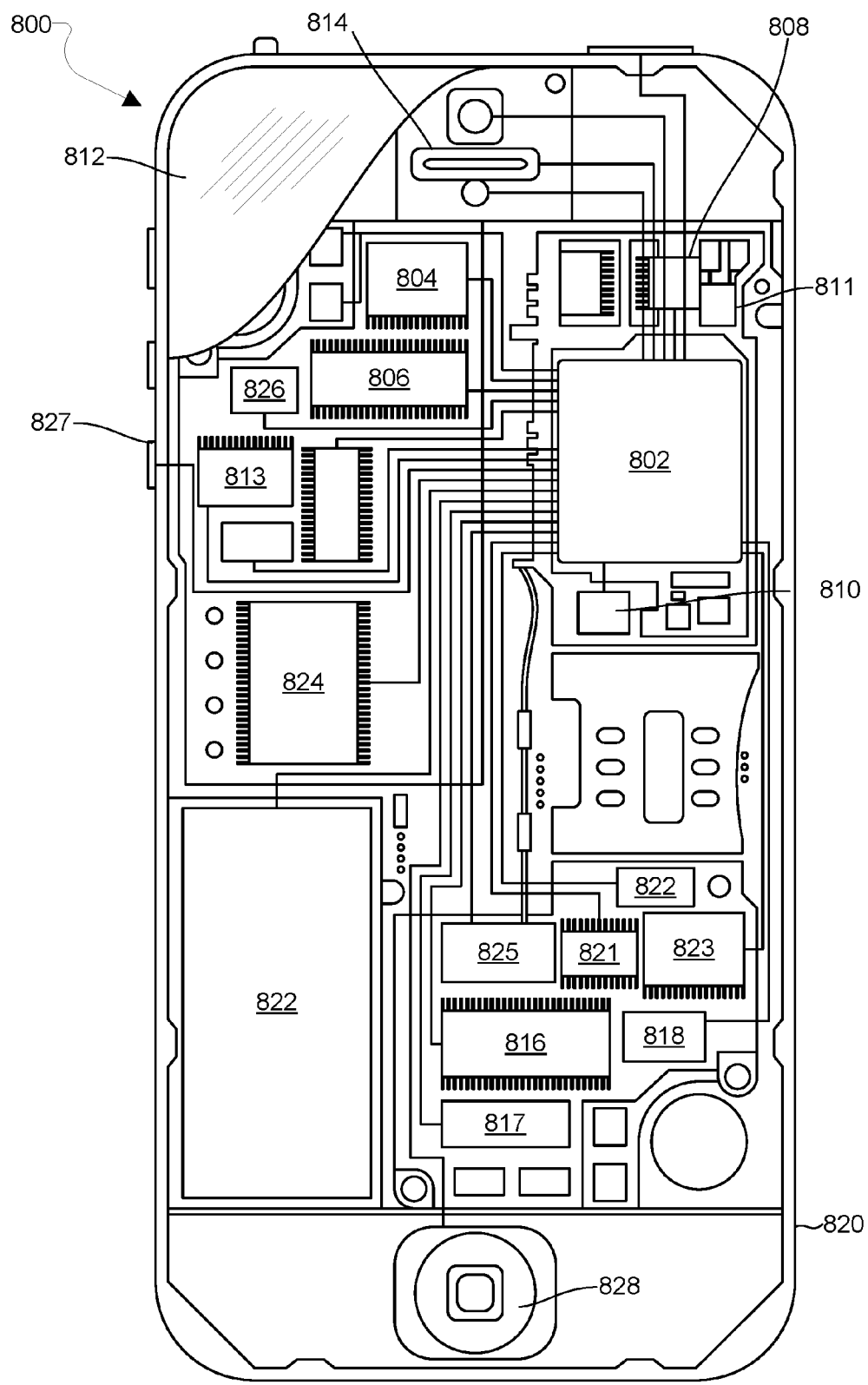
FIG. 8 is a component block diagram of a communication device suitable for implementing some embodiments.

Various embodiments may be implemented in any of a variety of communication devices, an example on which (e.g., communication device 800) is illustrated in FIG. 8. With reference to FIGS. 1-8, the communication device 800 may be similar to the communication device 110 and may implement the method 300, the method 500, and/or the method 700 as described.

The communication device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the communication device 800 need not have touch screen capability.

The communication device 800 may have one or more cellular network transceivers 808 coupled to the processor 802 and to one or more antennae 810 and configured for sending and receiving cellular communications. The transceiver 808 and the antenna 810 may be used with the circuitry mentioned herein to implement the methods of various embodiments. The communication device 800 may include one or more SIM cards (e.g., SIM 813) coupled to the transceiver 808 and/or the processor 802 and configured as described. The communication device 800 may include a cellular network wireless modem chip 817 that enables communication via a cellular network and is coupled to the processor 802.

The communication device 800 may have one or more WLAN transceivers 816 (e.g., one or more Wi-Fi transceivers) coupled to the processor 802 and to one or more antennae 811 and configured for sending and receiving WLAN communications. The transceiver 816 and the antenna 811 may be used with the circuitry mentioned herein to implement the methods of various embodiments. The communication device 800 may include a WLAN wireless modem chip 818 that enables communication via WLAN and is coupled to the processor 802.

The communication device 800 may have one or more Bluetooth transceivers 821 coupled to the processor 802 and to one or more antennae 829 and configured for sending and receiving Bluetooth communications. The transceiver 821 and the antenna 829 may be used with the circuitry mentioned herein to implement the methods of various embodiments. The communication device 800 may include a Bluetooth wireless modem chip 823 that enables communication via Bluetooth and is coupled to the processor 802.

The communication device 800 may have one or more satellite transceivers 824 coupled to the processor 802 and to one or more antennae 825 and configured for sending and receiving Bluetooth communications. The transceiver 824 and the antenna 825 may be used with the circuitry mentioned herein to implement the methods of various embodiments. The communication device 800 may include a satellite wireless modem chip 826 that enables communication via satellite networks and is coupled to the processor 802.

The communication device 800 may also include speakers 814 for providing audio outputs. The communication device 800 may also include a housing 820, constructed of a plastic, metal, or a combination of materials, for containing all or some of the components discussed herein. The communication device 800 may include a power source 822 coupled to the processor 802, such as a disposable or rechargeable battery. The rechargeable battery may also be coupled to the peripheral device connection port to receive a charging current from a source external to the communication device 800. The peripheral device connection port, such as a USB port, may be connected to the processor 802, and may be configured to established wired network connections via wired interface technologies and may be used with the circuitry mentioned herein to implement the methods of the various embodiments. The communication device 800 may also include a physical button 828 for receiving user inputs. The communication device 800 may also include a power button 827 for turning the communication device 800 on and off The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to some embodiments without departing from the scope of the claims. Thus, the present disclosure is not intended to be limited to the examples shown herein but is to be accorded the widest scope consistent with the following claims and the principles and novel features disclosed herein.

What is claimed is:

1. A method of network probing by a communication device, comprising:
   establishing, by the communication device, a first network connection of a first interface technology and a second network connection of a second interface technology;
   associating the first network connection with a probing client running on a processor of the communication device and associating the second network connection with a probing server running on the processor;
   transmitting a probe addressed to the probing server from the probing client via the first network connection;
   receiving the probe at the probing server via the second network connection; and
   determining a network observation based on receiving the probe at the probing server.

2. The method of claim 1, wherein the first interface technology and the second interface technology are different air interface technologies.

3. The method of claim 2, wherein the different air interface technologies are a cellular air interface technology and a WLAN interface technology.

4. The method of claim 3, wherein the cellular air interface technology is at least one member of the group consisting of 3G, 4G, LTE, and Edge.

5. The method of claim 1, wherein the probing client and the probing server are time-synchronized.

6. The method of claim 5, wherein the probing client and the probing server operate based on a same clock of the communication device.

7. The method of claim 1, further comprising:
   collecting first network setup information for the first network connection via the probing client;
   collecting second network setup information for the second network connection via the probing server; and
   generating the probe addressed to the probing server based at least in part on the first network setup information and the second network setup information.

8. The method of claim 1, wherein:
   transmitting the probe addressed to the probing server from the probing client via the first network connection comprises transmitting a plurality of probes addressed to the probing server from the probing client via the first network connection;
   receiving the probe at the probing server via the second network connection comprises receiving the plurality of probes at the probing server via the second network connection; and
   determining the network observation based on receiving the probe at the probing server comprises determining the network observation based on receiving the plurality of probes at the probing server.

9. The method of claim 1, wherein the network observation is an inter-packet delay.

10. The method of claim 1, wherein the network observation is a network delay.

11. The method of claim 10, wherein the network delay is a round trip time or inter-packet delay.

12. The method of claim 1, further comprising:
   transmitting a probe addressed to the probing client from the probing server via the second network connection; and
   receiving the probe at the probing client via the first network connection,
   wherein determining the network observation based on receiving the probe at the probing server comprises determining the network observation based on receiving the probe at the probing server and receiving the probe at the probing client.

13. A communication device, comprising:
   a first radio frequency (RF) resource;
   a second RF resource; and
   a processor coupled to the first RF resource and the second RF resource, wherein the processor is configured with processor executable instructions to perform operations to:
      establish a first network connection of a first interface technology;
      establish a second network connection of a second interface technology;
      associate the first network connection with a probing client running on a processor of the communication device;
      associate the second network connection with a probing server running on the processor;
      transmit a probe addressed to the probing server from the probing client via the first network connection;
      receive the probe at the probing server via the second network connection; and
      determine a network observation based on receiving the probe at the probing server.

14. The communication device of claim 13, wherein the first interface technology and the second interface technology are different air interface technologies.

15. The communication device of claim 14, wherein the different air interface technologies are a cellular air interface technology and a WLAN interface technology.

16. The communication device of claim 15, wherein the cellular air interface technology is at least one member of the group consisting of 3G, 4G, LTE, and Edge.

17. The communication device of claim 13, wherein the probing client and the probing server are time-synchronized.

18. The communication device of claim 17, wherein the probing client and the probing server operate based on a same clock of the communication device.

19. The communication device of claim 13, wherein the processor is configured with processor executable instructions to perform further operations to:
   collect first network setup information for the first network connection via the probing client;
   collect second network setup information for the second network connection via the probing server; and
   generate the probe addressed to the probing server based at least in part on the first network setup information and the second network setup information.

20. The communication device of claim 13, wherein the processor is configured with processor executable instructions to perform further operations to:
- transmit the probe addressed to the probing server from the probing client via the first network connection by transmitting a plurality of probes addressed to the probing server from the probing client via the first network connection;
- the probe at the probing server via the second network connection by receiving the plurality of probes at the probing server via the second network connection; and
- the network observation based on receiving the probe at the probing server by the network observation based on receiving the plurality of probes at the probing server.

21. The communication device of claim 13, wherein the network observation is an inter-packet delay.

22. The communication device of claim 13, wherein the network observation is a network delay.

23. The communication device of claim 22, wherein the network delay is a round trip time or inter-packet delay.

24. The communication device of claim 13, wherein the processor is configured with processor executable instructions to perform operations further operations to:
- a probe addressed to the probing client from the probing server via the second network connection; and
- the probe at the probing client via the first network connection,
- wherein the processor is further configured with processor executable instructions to determine the network observation based on receiving the probe at the probing server by determining the network observation based on receiving the probe at the probing server and receiving the probe at the probing client.

25. A communication device, comprising:
- means for establishing a first network connection of a first interface technology and a second network connection of a second interface technology;
- means for associating the first network connection with a probing client running on a processor of the communication device and associating the second network connection with a probing server running on the processor;
- means for transmitting a probe addressed to the probing server from the probing client via the first network connection;
- means for receiving the probe at the probing server via the second network connection; and
- means for determining a network observation based on receiving the probe at the probing server.

26. The communication device of claim 25, wherein the first interface technology and the second interface technology are different air interface technologies.

27. The communication device of claim 25, further comprising:
- means for transmitting a probe addressed to the probing client from the probing server via the second network connection; and
- means for receiving the probe at the probing client via the first network connection,
- wherein means for determining the network observation based on receiving the probe at the probing server comprises means for determining the network observation based on receiving the probe at the probing server and receiving the probe at the probing client.

28. A non-transitory processor readable medium having stored thereon processor executable instructions configured to cause a processor of a communication device to perform operations comprising:
- establishing a first network connection of a first interface technology and a second network connection of a second interface technology;
- associating the first network connection with a probing client running on a processor of the communication device and associating the second network connection with a probing server running on the processor;
- transmitting a probe addressed to the probing server from the probing client via the first network connection;
- receiving the probe at the probing server via the second network connection; and
- determining a network observation based on receiving the probe at the probing server.

29. The non-transitory processor readable medium of claim 28, wherein the stored processor executable instructions are configured to cause a processor of a communication device to perform operations such that the first interface technology and the second interface technology are different air interface technologies.

30. The non-transitory processor readable medium of claim 28, wherein the stored processor executable instructions are configured to cause a processor of a communication device to perform operations further comprising:
- transmitting a probe addressed to the probing client from the probing server via the second network connection; and
- receiving the probe at the probing client via the first network connection, and
- wherein the stored processor executable instructions are configured to cause a processor of a communication device to perform operations such that determining the network observation based on receiving the probe at the probing server comprises determining the network observation based on receiving the probe at the probing server and receiving the probe at the probing client.

* * * * *